(12) United States Patent
Chen

(10) Patent No.: US 7,411,740 B2
(45) Date of Patent: Aug. 12, 2008

(54) ZOOM LENS

(75) Inventor: Ming-chung Chen, Tantz Shiang (TW)

(73) Assignee: Asia Optical Co., Inc, Taichung (TW)

( * ) Notice: Subject to any disclaimer, the term of this patent is extended or adjusted under 35 U.S.C. 154(b) by 0 days.

(21) Appl. No.: 11/834,825

(22) Filed: Aug. 7, 2007

(65) Prior Publication Data

US 2008/0068725 A1    Mar. 20, 2008

(30) Foreign Application Priority Data

Sep. 15, 2006    (TW) .............................. 95134365 A

(51) Int. Cl.
*G02B 15/14* (2006.01)
(52) U.S. Cl. .................. 359/683; 359/676; 359/684; 359/685; 359/708; 359/713; 359/740; 359/755
(58) Field of Classification Search .............. 359/676, 359/683–685, 708, 713, 740, 755
See application file for complete search history.

(56) References Cited

U.S. PATENT DOCUMENTS

| | | | | |
|---|---|---|---|---|
| 6,785,055 B2 * | 8/2004 | Nishikawa et al. | .......... | 359/683 |
| 6,989,939 B2 * | 1/2006 | Yamasaki et al. | ........... | 359/676 |
| 7,224,535 B2 * | 5/2007 | Neil | ........................... | 359/683 |
| 7,312,934 B2 * | 12/2007 | Iwasawa | ..................... | 359/676 |
| 7,327,953 B2 * | 2/2008 | Tamura | ...................... | 359/676 |
| 2004/0021953 A1 * | 2/2004 | Betensky et al. | ............ | 359/676 |
| 2004/0201902 A1 * | 10/2004 | Mihara et al. | ............... | 359/676 |
| 2005/0259330 A1 * | 11/2005 | Neil | ........................... | 359/676 |
| 2006/0056043 A1 * | 3/2006 | Nakazawa et al. | .......... | 359/676 |

* cited by examiner

*Primary Examiner*—Evelyn A. Lester

(57) ABSTRACT

Disclosed is a zoom lens, which includes, in sequence from an object side to an image side, a positive first lens group, a negative second lens group, a positive third lens group, a positive fourth lens group, a fifth lens group, a negative sixth lens group and a positive lens group. The first, third, fifth and seventh lens groups are fixed. When the zoom lens is made to zoom from a wide-angle end to a telephoto end, the second and fourth lens groups move toward the third lens group, while the sixth lens group moves toward the seventh lens group. The absolute value of the ratio of the focal distance of the second lens group to that of the sixth lens group is within a range between 0.1 and 0.5.

16 Claims, 12 Drawing Sheets

ZOOM LENS

FIELD OF THE INVENTION

The present invention generally relates to a zoom lens, and especially a compact periscope-type zoom lens having high magnification and excellent imaging performance.

BACKGROUND OF THE INVENTION

In order to realize convenient photography operation, various digital cameras adopt optical zoom lens. The optical zoom lens can effectively change the focal length of photography while maintains a good imaging quality thereof. The optical zooming is different from digital zooming whose imaging quality will be adversely affected when the focal length of photography is changed.

U.S. patent application No. US2005/0099700A1 discloses a compact zoom lens comprising four lens groups with positive, negative, positive and positive refraction powers, respectively. When the zoom lens is zoomed from a wide-angle end to a telephoto end, the first and third lens groups remain fixed, while the second lens group moves toward an image side thereof. Although this known zoom lens is relatively compact, it does not provide a high magnification.

A conventional optical zoom lens with a high magnification normally needs a space with a relatively long length for change of focal length. A telescopic lens is such a kind of zoom lens whose lens can be outstretched beyond the body of the camera accommodating it. Most of the digital cameras available on the market use a telescopic zoom lens. The telescopic lens normally adopts one negative lens group, two positive lens groups and three positive lens groups among which a retractable lens group is arranged for zooming operation and this arrangement provides a compact structure. However, the distance required by such a telescopic lens to zoom is inevitably quite long if it aims to acquire a high magnification. Thus, the requirement of the miniaturization cannot be fully met.

A periscope-type zoom lens is another kind of zoom lens having a retractable and extendable lens, which does not need to extend out of the camera accommodating it. The periscope-type zoom lens works in such a way that a light beam entering the lens does not travel along a linear path, and instead, the beam is reflected by a mirror and then refracted into the camera. The lens moves within the camera for zooming or focusing, but does not extend out of the camera. Therefore, the size of a digital camera adopting the periscope zoom lens is much smaller and the camera lens can be effectively protected as there is no need to stretch the lens out of the camera.

Hence, a periscope-type zoom lens is an optimal solution to solve the conflictive and simultaneous requirements of high magnification and miniaturization.

The present invention is thus aimed to provide a novel periscope-type zoom lens.

SUMMARY OF THE INVENTION

An objective of the present invention is to provide a periscope-type zoom lens, which is a compact optical system with high magnification and also features good imaging performance and short opening time.

To accomplish the above objective, the present invention provides a zoom lens, which comprises in sequence from an object side to an image side: a first lens group having a positive refraction power, a second lens group having a negative refraction power, a third lens group having a positive refraction power, a fourth lens group having a positive refraction power, a fifth lens group, a sixth lens group having a negative refraction power, and a seventh lens group having a positive refraction power.

The first, third, fifth and seventh lens groups are fixed. And, when the zoom lens is made to zoom from a wide-angle end to a telephoto end thereof, the second and fourth lens groups move toward the third lens group while the sixth lens group moves toward the seventh lens group.

In accordance with the present invention, the focal distance of the second lens group, GU2f, and the focal distance of the sixth lens group, GU6f, satisfy the requirement: $0.1<|GU2f/GU6f|<0.5$.

The first lens group comprises two lenses and the reflection element is located between the two lenses. The reflection element has a refraction optical axis. The lens of the first lens group, which is located away from the object side, has two aspheric surfaces.

The second lens group has three lenses. The third lens group has one lens with two aspheric surfaces In an embodiment of the present invention, the fourth lens group has two lenses and the lens close to (or facing) the object side contains an aspheric surface. The fifth lens group has one lens, the sixth lens group has two lenses and the seventh lens group has one lens.

In another embodiment of the present invention, the fifth lens group has one lens and the lens can be selectively formed with two aspheric surfaces.

The zoom lens in accordance with the present invention has a plurality of moveable lens groups, which effectively decrease the moving distance of each lens group. Thus, the size of the zoom lens can be greatly miniaturized. Also, the design of the present invention can ensure the optimum imaging performance at any of the focal points thereof as zoomed. Therefore, the zoom lens of the present invention has the advantages of high magnification and good imaging performance.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
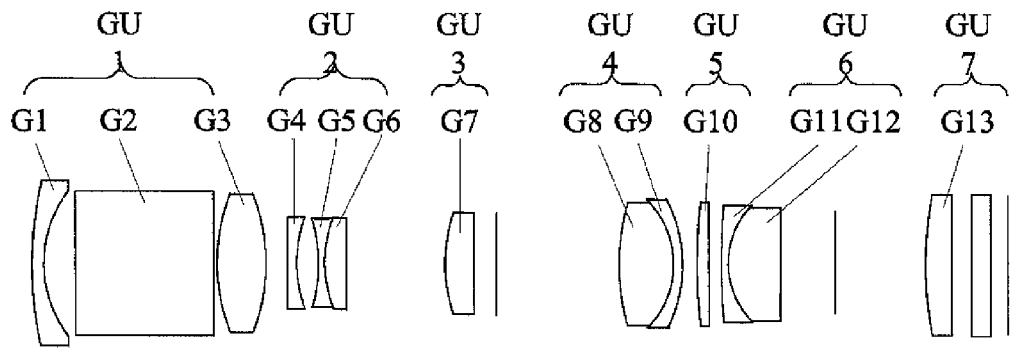
FIG. 1 is a schematic view of a zoom lens constructed in accordance with the present invention.

With reference to drawings and in particular to FIG. 1, a zoom lens in accordance with the present invention comprises: in sequence from an object side to an image side thereof, a first lens group GU1 having a positive refraction power, a second lens group GU2 having a negative refraction power, a third lens group GU3 having a positive refraction power, a fourth lens group GU4 having a positive refraction power, a fifth lens group GU5, a sixth lens group GU6 having a negative refraction power, and a seventh lens group GU7 having a positive refraction power.

The first, third, fifth and seventh lens groups GU1, GU3, GU5, GU7 are fixed with respect to a refraction axis thereof, while the second, fourth and sixth lens groups are moveable along the common refraction axis so as to realize zooming operation of the zoom lens of the present invention.

The first lens group GU1 comprises a reflection element G2 for folding an optic axis of the zoom lens system. The focal distance GU2$f$ of the second lens group GU2 and the focal distance GU6$f$ of the sixth lens group GU6 satisfy the requirement: 0.1<|GU2$f$/GU6$f$|<0.5.

The first lens group GU1 comprises two lenses G1, G3 and the reflection element G2. The reflection element G2 is located between the two lenses G1 and G3. The lens G3, which is further away from the object side as compared to element G2 and lens G1, contains two aspheric surfaces. The second lens group GU2 has three lenses G4, G5 and G6. The third lens group GU3 has a lens G7 containing two aspheric surfaces.

The fourth lens group GU4 has two lenses G8 and G9, and the lens G8, which is closer to the object side as compared to lens G9, contains an aspheric surface. Preferably, the aspheric surface faces the object side.

The fifth lens group GU5 has a lens G10, which selectively has one aspheric surface and preferably two surfaces (such as that illustrated in Table 5). The sixth lens group GU6 has two lenses G11 and G12, while the seventh lens group GU7 has a lens G13.

Figure 2A:
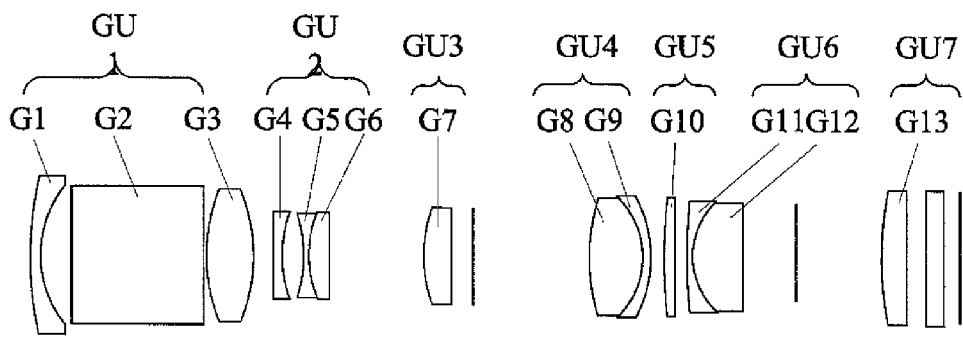
FIG. 2A is a schematic view of the zoom lens in accordance with the present invention located at a wide-angle end thereof.
Figure 2B:
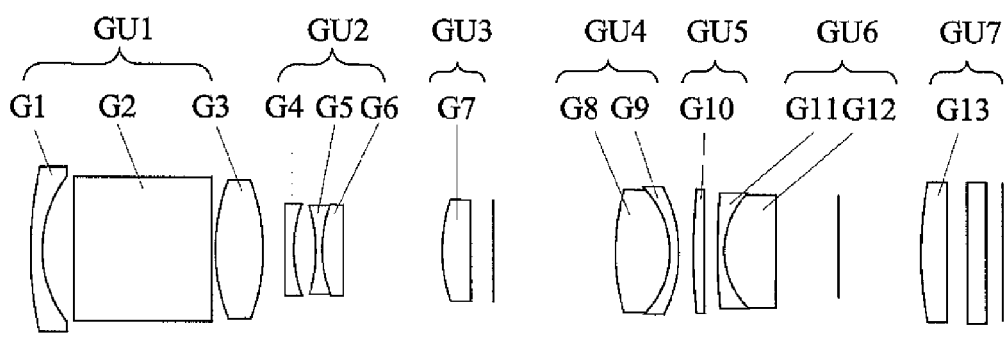
FIG. 2B is a schematic view of the zoom lens in accordance with the present invention located at a medium position thereof.
Figure 2C:
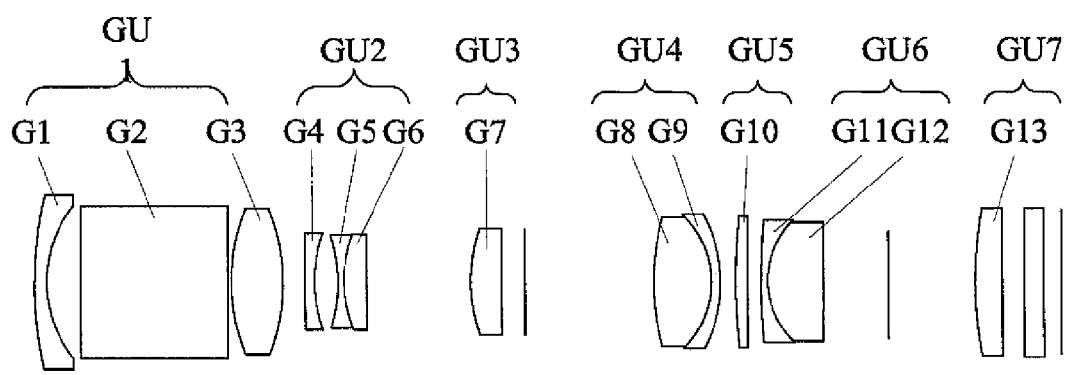
FIG. 2C is a structure schematic view of the zoom lens in accordance with the present invention located at a telephoto end thereof.
Figure 3A:
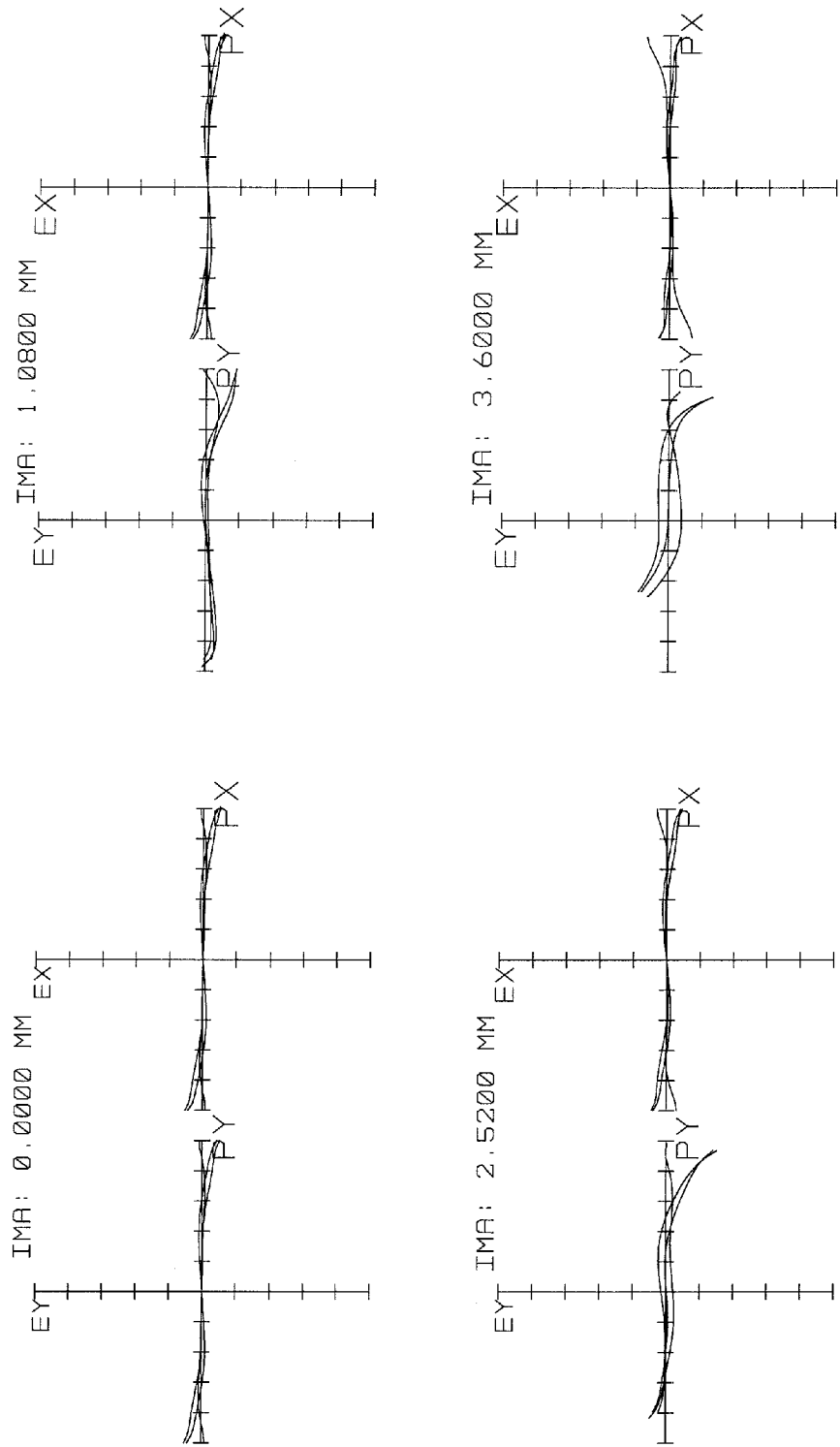
FIG. 3A is a coma aberration view of the zoom lens in accordance with a first embodiment of the present invention when at the wide-angle end thereof.
Figure 3B:
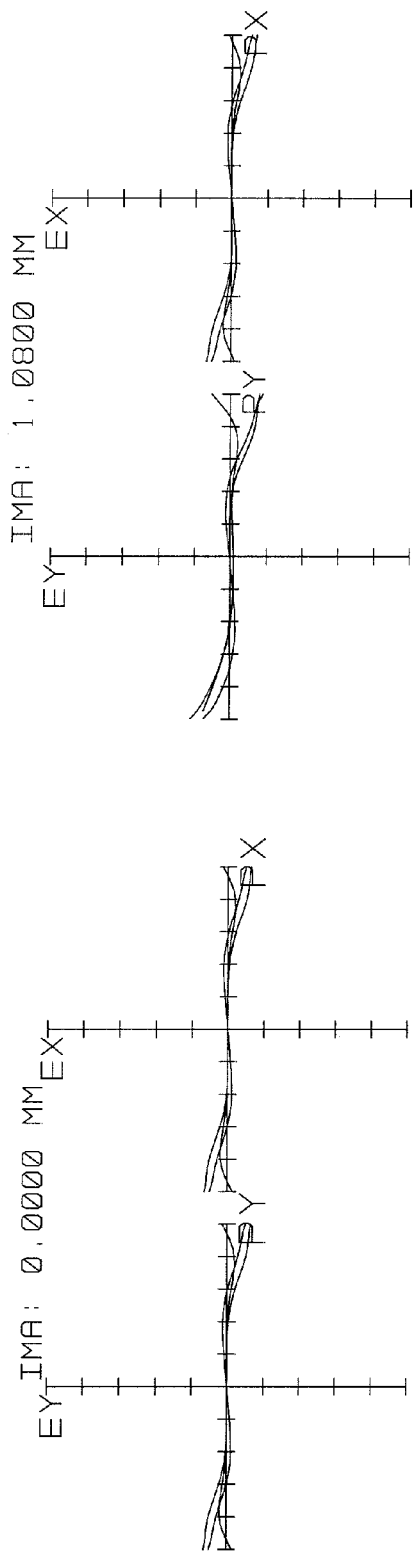
FIG. 3B is a coma aberration view of the zoom lens in accordance with the first embodiment of the present invention when at the medium position thereof.
Figure 3C:
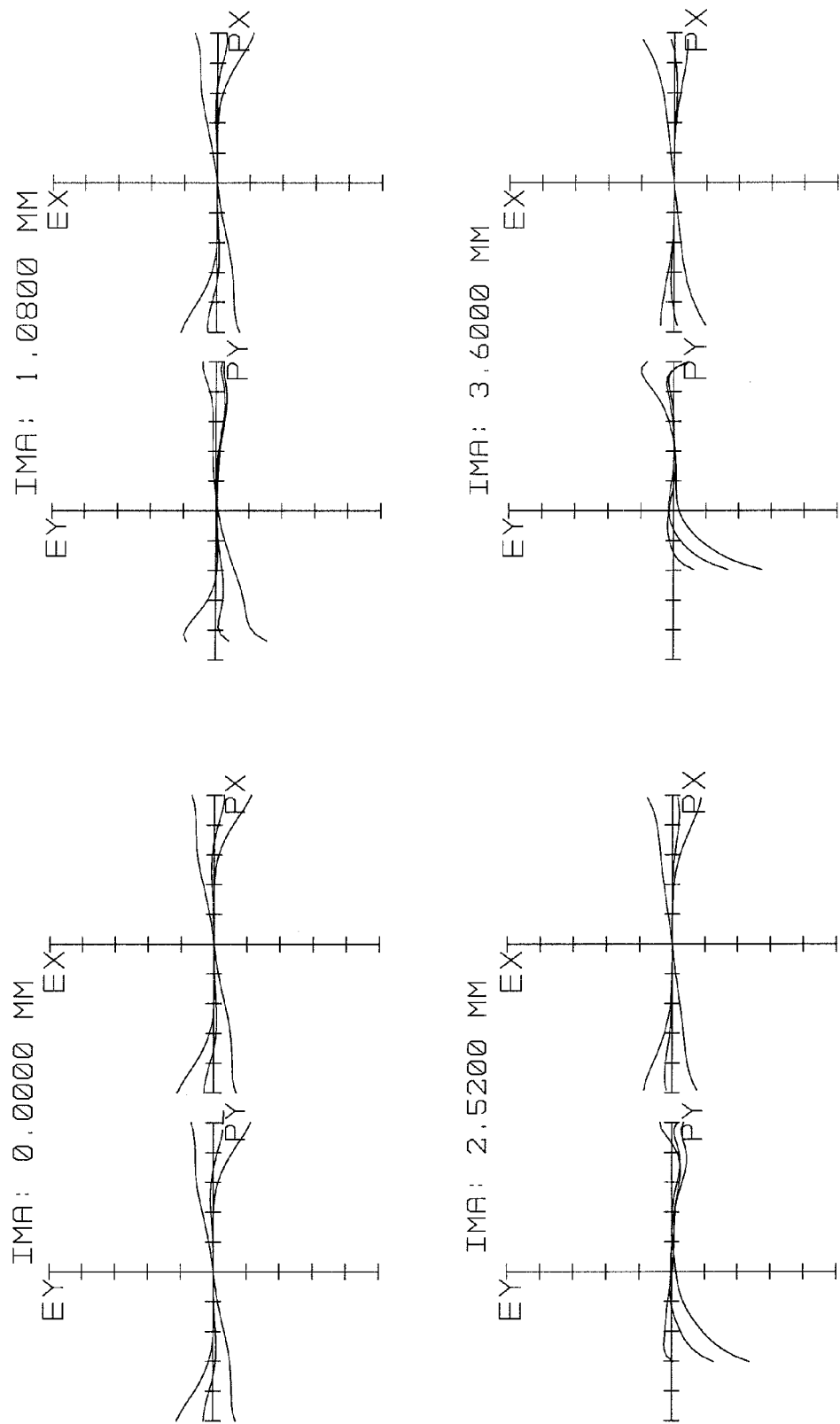
FIG. 3C is a coma aberration view of the zoom lens in accordance with the first embodiment of the present invention when at the telephoto end thereof.
Figure 4A:
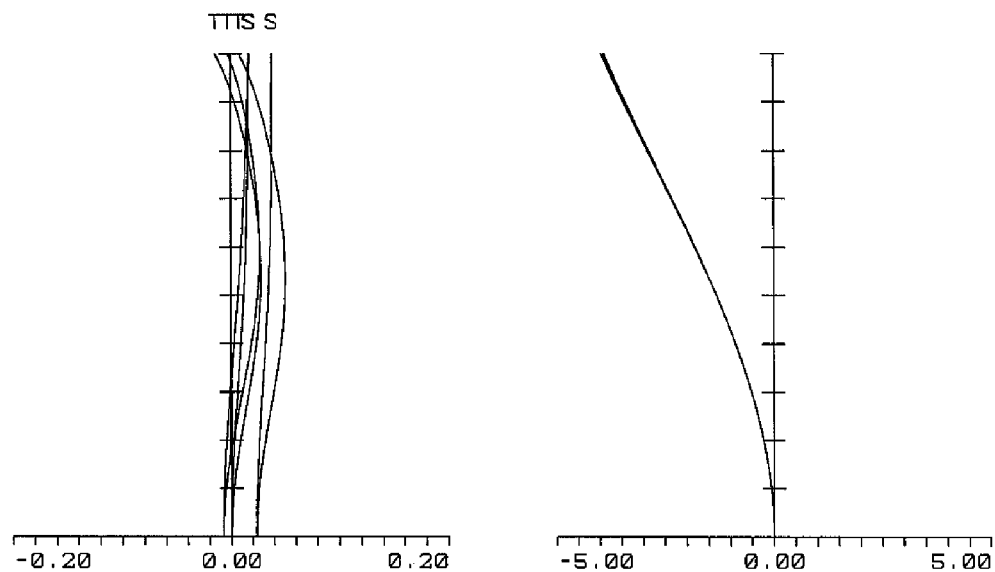
FIG. 4A is a field curves aberration and distortion view of the zoom lens in accordance with the first embodiment of the present invention when at the wide-angle end thereof.
Figure 4B:
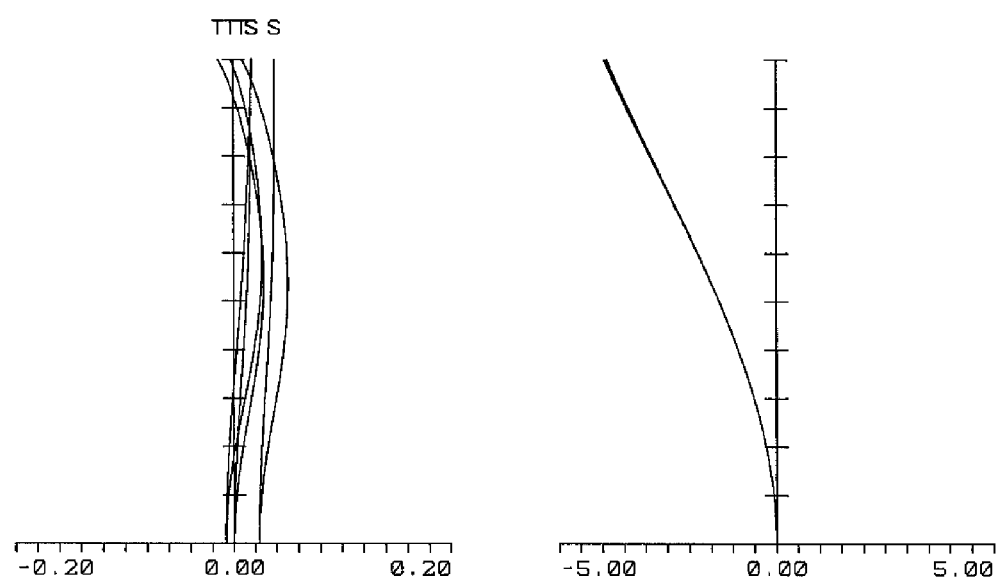
FIG. 4B is a field curves aberration and distortion view of the zoom lens in accordance with the first embodiment of the present invention when at the medium position thereof.
Figure 4C:
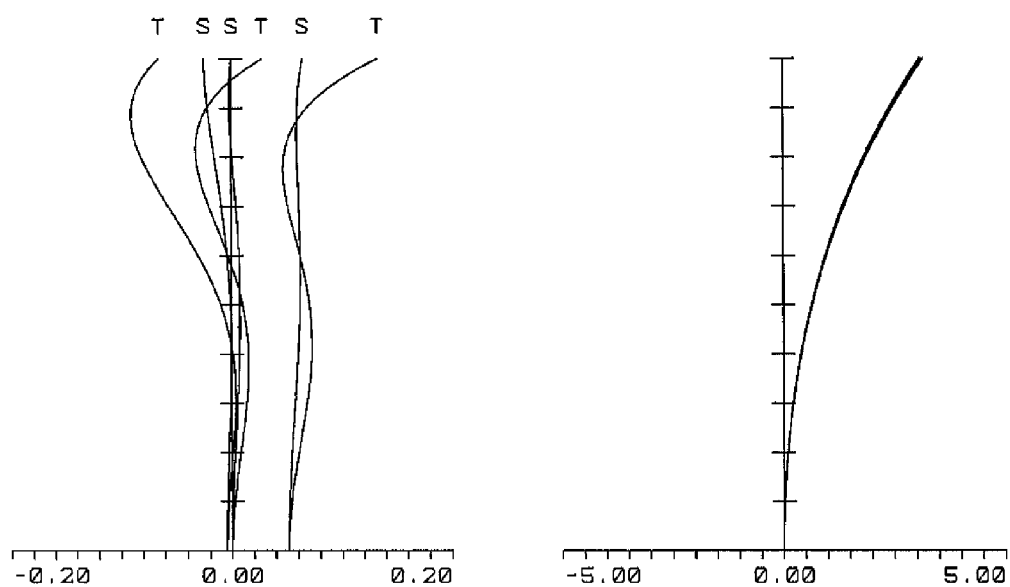
FIG. 4C is a field curves aberration and distortion view of the zoom lens in accordance with the first embodiment of the present invention when at the telephoto end thereof.
Figure 5A:
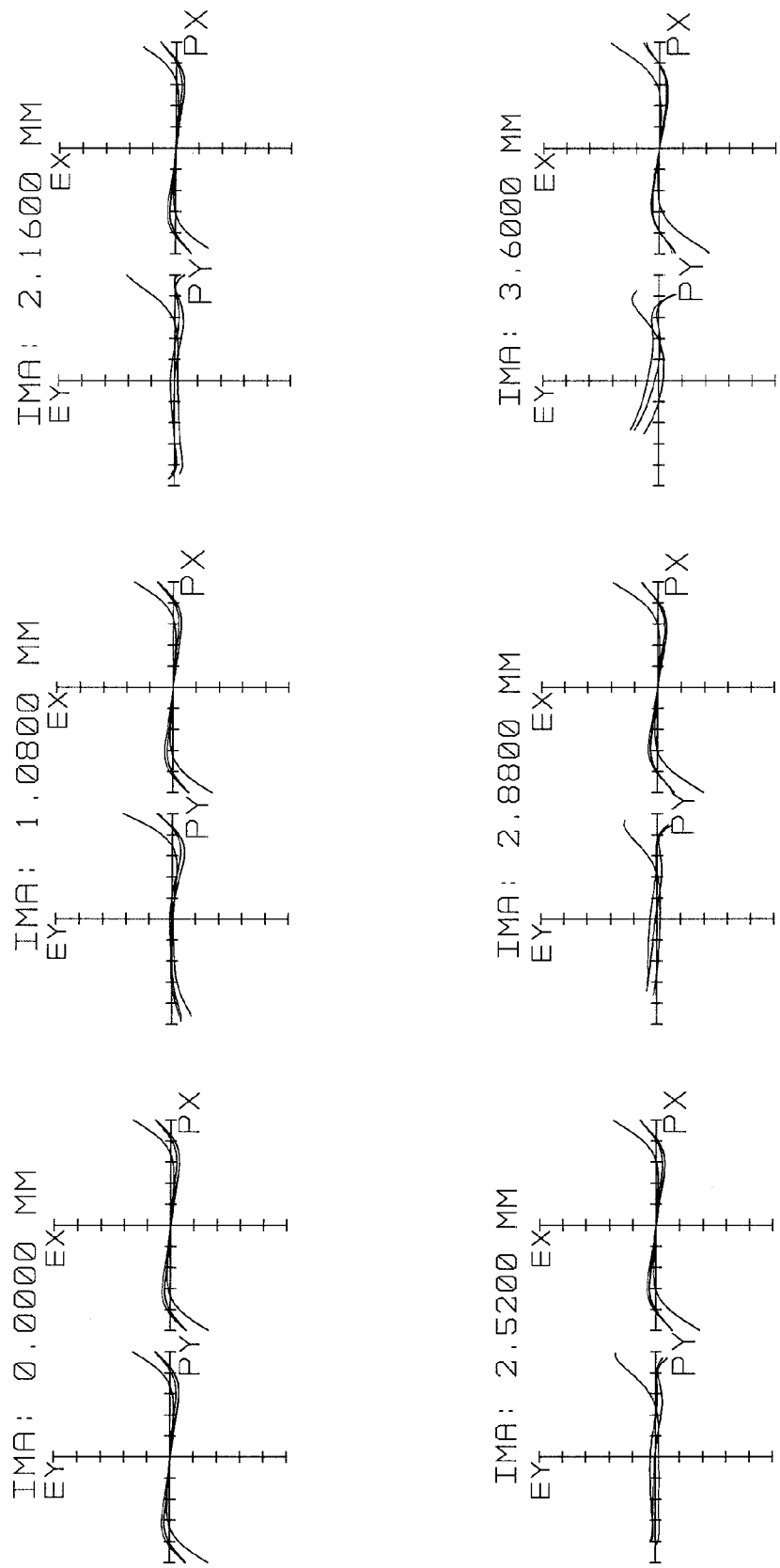
FIG. 5A is a coma aberration view of the zoom lens in accordance with a second first embodiment of the present invention when at the wide-angle end thereof.
Figure 5B:
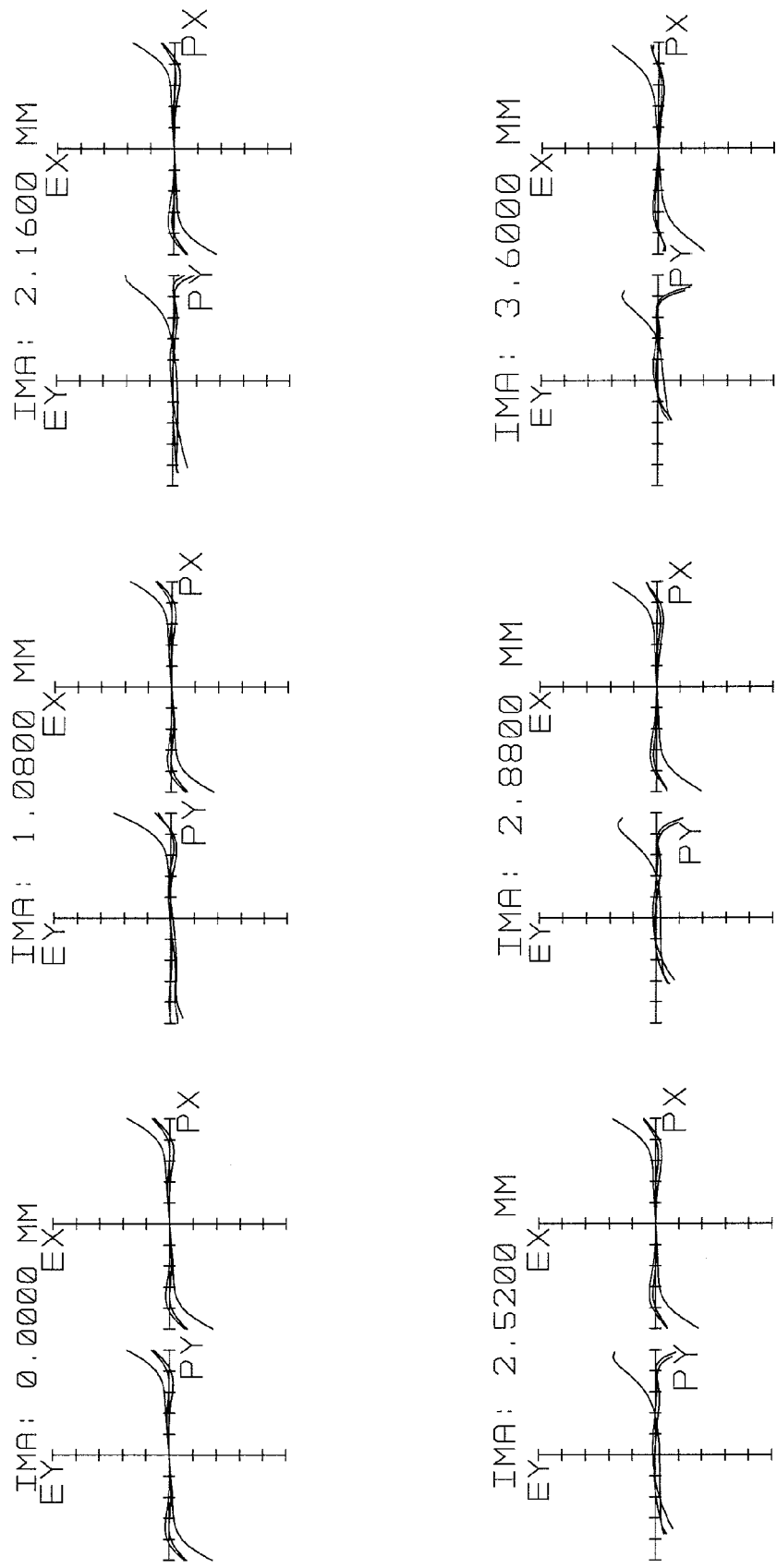
FIG. 5B is a coma aberration view of the zoom lens in accordance with the second embodiment of the present invention when at the medium position thereof.
Figure 5C:
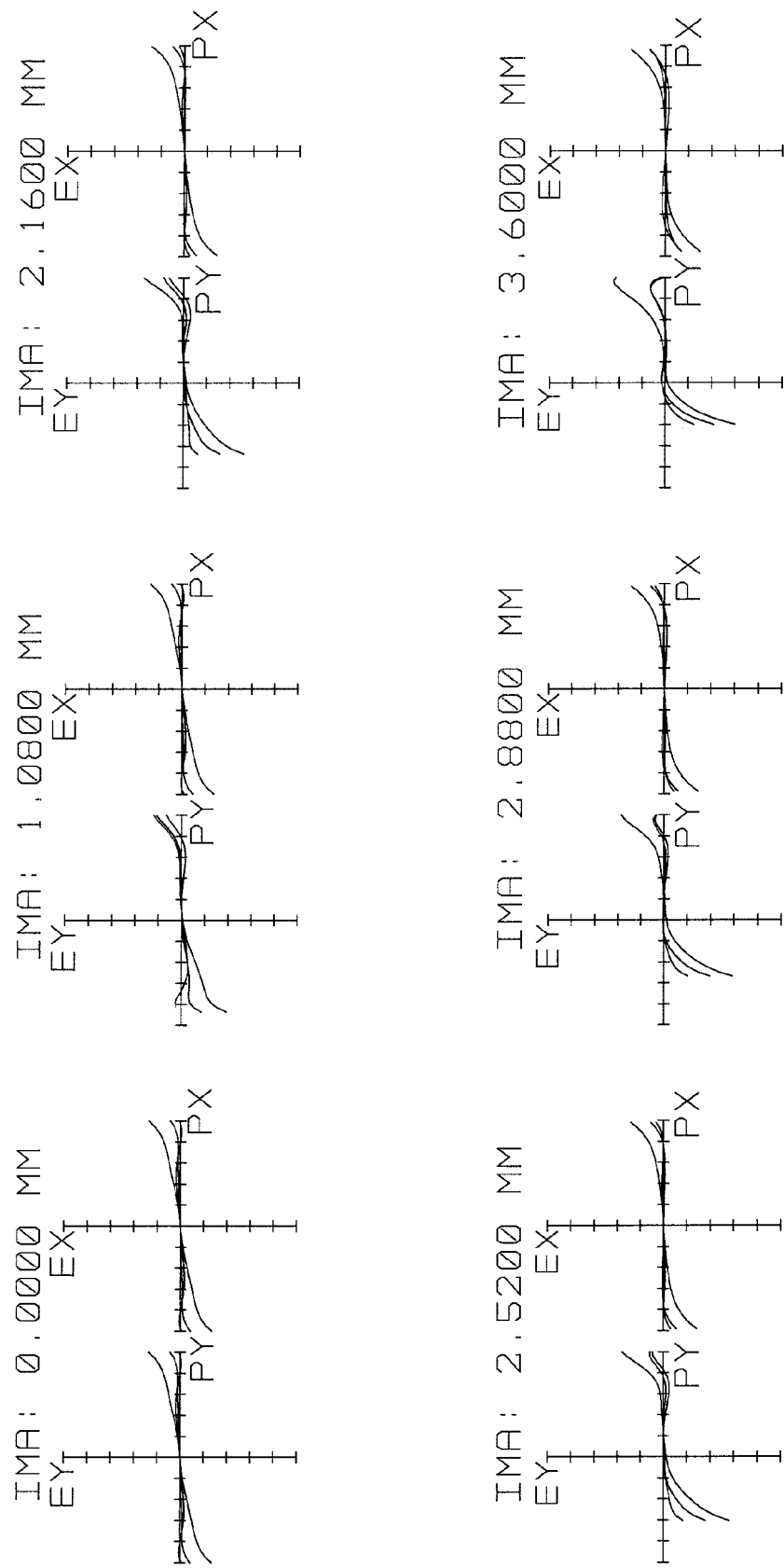
FIG. 5C is a coma aberration view of the zoom lens in accordance with the second embodiment of the present invention when at the telephoto end thereof.
Figure 6A:
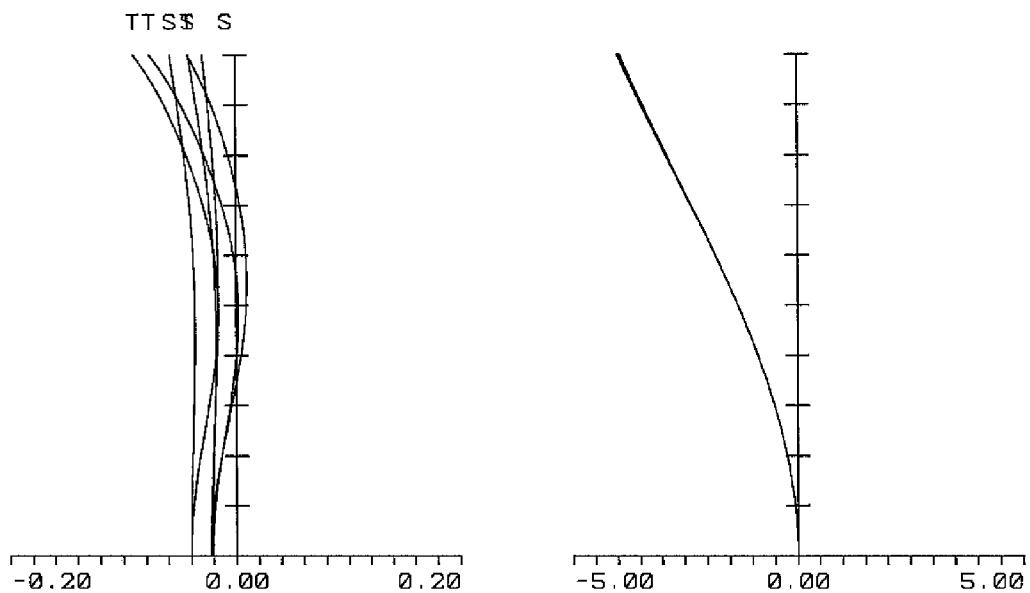
FIG. 6A is a field curves aberration and distortion view of the zoom lens in accordance with the second embodiment of the present invention when at the wide-angle end thereof.
Figure 6B:
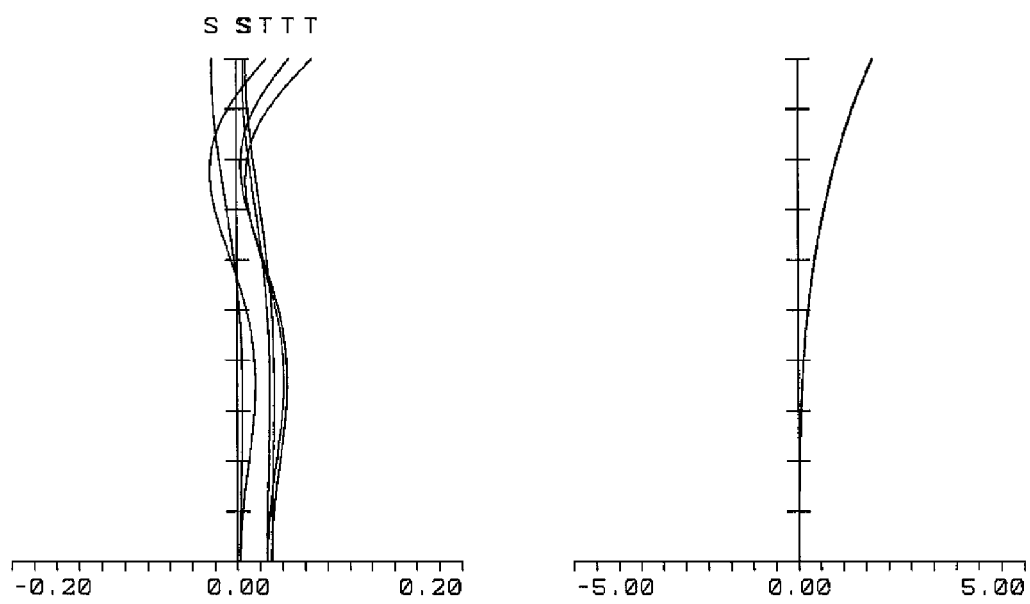
FIG. 6B is a field curves aberration and distortion view of the zoom lens in accordance with the second embodiment of the present invention when at the medium position thereof.
Figure 6C:
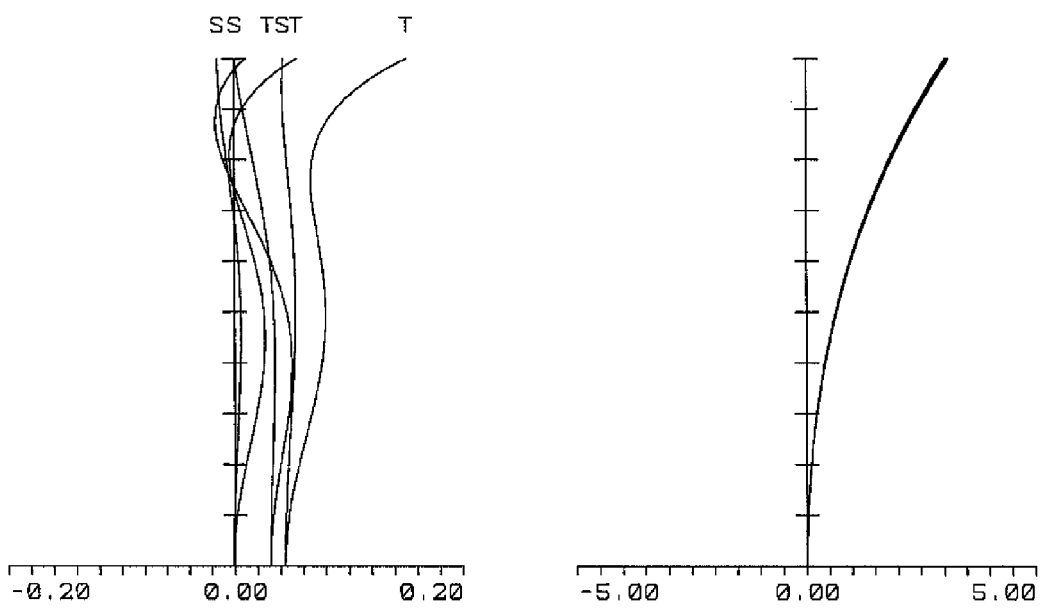
FIG. 6C is a field curves aberration and distortion view of the zoom lens in accordance with the second embodiment of the present invention when at the telephoto end thereof.

FIGS. 2A-2C show schematic views of the zoom lens of the present invention at a wide-angle end, a medium position and a telephoto end respectively. When the zoom lens of the present invention zooms from the wide-angle end to the telephoto end, the second and fourth lens groups GU2, GU4 move toward the third lens group GU3 while the sixth lens group GU6 moves toward the seventh lens group GU7. In other words, the second lens group GU2 and the sixth lens group GU6 are moved in a direction toward the image side, while the fourth lens group GU4 is moved in an opposite direction toward the object side.

Table 1 gives parameters of the lenses comprised of the first embodiment of the present invention. In the table, Nd represents refractive index and Vd represents Abbe-number. It is noted in Table 1 that "LPF" indicates a low pass filter having opposite planar surfaces; "IMA" is an image plane; and "Ref Plane 1" and "Ref Plane 2", which denotes reference planes 1 and 2, are two imaginary fixed surfaces. It is also noted that "distance between lens surfaces" indicates the distance between the surface of the associated row and the surface of the next row. For example, for surface 1, the distance between lens surfaces means the distance between surfaces 1 and 2 of the table. Also, lens G5 and G6 are cemented together, so that lens G5 is shown having only one surface in Table 1, for the other surface of lens G5 is exactly coincident with one surface of the lens G6. This is also applicable to lens pairs of G8, G9 and G11, G12.

TABLE 1

| Surface | Lens | Curvature radius | Distance between lens surfaces | Nd | Vd |
|---|---|---|---|---|---|
| 1 | G1 | 32.20 | 0.62 | 1.923 | 20.9 |
| 2 |  | 7.65 | 1.34 |  |  |
| 3 | G2 | infinite | 6.8 | 1.835 | 42.7 |
| 4 |  | infinite | 0.3 |  |  |
| 5 | G3 | 12.08 | 2.15 | 1.739 | 48.8 |
| 6 |  | −13.74 | A |  |  |
| 7 | G4 | 72.68 | 0.5 | 1.816 | 46.6 |
| 8 |  | 6.79 | 0.92 |  |  |
| 9 | G5 | −10.00 | 0.45 | 1.788 | 47.4 |
| 10 | G6 | 7.69 | 0.93 | 1.923 | 20.9 |
| 11 |  | 31.90 | B |  |  |
| 12 | G7 | 11.30 | 1.42 | 1.802 | 40.7 |
| 13 |  | −62.73 | 0.95 |  |  |
| 14 | Ref Plane 1 | infinite | C |  |  |
| 15 | G8 | 12.6978 | 2.4 | 1.589 | 61.2 |
| 16 | G9 | −5.504 | 0.58 | 1.805 | 25.4 |
| 17 |  | infinite | 0.5 |  |  |
| 18 | G10 | 80 | 0.5 | 1.516 | 64.1 |
| 19 |  | 120 | 0.55 |  |  |
| 20 | G11 | 54.378 | 0.5 | 1.749 | 35.3 |
| 21 | G12 | 4.86 | 2.31 | 1.439 | 95.0 |
| 22 |  | 64.865 | D |  |  |
| 23 | Ref Plane 2 | infinite | 6.32 |  |  |
| 24 | G13 | 40 | 1.18 | 1.541 | 47.2 |
| 25 |  | −186.473 | 1.07 |  |  |
| 26 | LPF | infinite | 0.8 | 1.516 | 64.1 |
| 27 |  | infinite | 2.15 |  |  |
| IMA |  | infinite |  |  |  |

A general formula for an aspheric surface is well known:

$$D = \frac{CH^2}{1+\sqrt{1-(1+K)C^2H^2}} + E_4H^4 + E_6H^6 + E_8H^8 + E_{10}H^{10} + E_{12}H^{12}$$

where $C=1/R$. In the equation, D represents the distance along the optical axis thereof on the height H to the utmost-convex point of the zooming lens; R represents the reference radius of the utmost convex surface of the lens; H represents the vertical height of the incident ray parallel to the optical axis thereof; K is the conical coefficient; and $E_4$, $E_6$, $E_8$, $E_{10}$, and $E_{12}$ represent, respectively, the aspheric coefficients of the fourth, sixth, eighth, tenth, and twelfth order. Table 2 gives the values of corresponding conic coefficient (K) and aspheric coefficients ($E_4$, $E_6$, $E_8$, $E_{10}$, $E_{12}$) of five aspheric surfaces of the lenses constituting the embodiment of the present invention.

TABLE 2

| | Surface | | | | |
|---|---|---|---|---|---|
| | 5 | 6 | 12 | 13 | 15 |
| K | 0 | 0 | 0 | 0 | 0 |
| $E_4$ | −1.6021E−04 | 1.2479E−05 | −2.8009E−04 | −8.3886E−05 | −3.0533E−04 |
| $E_6$ | 9.3716E−06 | 9.9225E−06 | 4.2973E−06 | 4.7298E−06 | 8.6294E−06 |
| $E_8$ | −7.4108E−07 | −7.9778E−07 | −1.0824E−06 | −8.5860E−07 | −7.3838E−07 |
| $E_{10}$ | 1.9181E−08 | 2.1730E−08 | 1.0426E−07 | 8.2848E−08 | 3.8833E−08 |
| $E_{12}$ | −1.8465E−11 | 2.0437E−11 | −1.1754E−12 | −6.7855E−13 | −5.1944E−11 |

Table 3 lists the values of the distance A between the first and second lens groups (namely the distance between the image-side surface of lens G3 of the first lens group and the object-side surface of lens G4 of the second lens group, as shown in FIG. 1), the distance B between the second and third lens groups (namely the distance between the image-side surface of lens G6 of the second lens group and the object-side surface of lens G7 of the third lens group), the distance C between reference plane 1, which is fixed and close to the image-side surface of lens G7 of the third lens group that is also fixed, and the object-side surface of lens G8 of the fourth lens group (which can be considered broadly as the distance between the third and fourth lens groups, and the distance D between the image-side surface of lens G12 of the sixth lens group and reference plane 2, which is fixed and in front of the object-side surface of lens G13 of the seventh lens group that is also fixed (which can be considered broadly as the distance between the sixth and seventh lens groups), when the zoom lens of the present invention is respectively located at the wide-angle end (W), the medium position (M) and the telephoto end (T) thereof.

TABLE 3

| | W | M | T |
|---|---|---|---|
| A | 0.50 | 3.49 | 5.66 |
| B | 5.58 | 2.59 | 0.42 |
| C | 6.36 | 4.42 | 2.08 |
| D | 1.03 | 0.43 | 0.00 |

FIGS. 3A-3C and 4A-4C are field curves aberration and distortion views of the periscope-type zoom lens of the first embodiment in accordance with the present invention.

FIGS. 5A-5C and 6A-6C are coma aberration views of the periscope-type zoom lens of the first embodiment.

In a second embodiment of the present invention, the aspheric surface of the lens G8 of the fourth lens group GU4 is the first surface of the fourth lens group GU4 arranged in the direction from the object side to the image side thereof, namely the surface closest to or facing the object side. The lens G10 of the fifth lens group GU5 has two aspheric surfaces. The sixth lens group GU6 has two lenses G11 and G12, while the seventh lens group GU7 has a lens G13.

Table 4 gives parameters of the lenses comprised of the second embodiment of the present invention. In the table, Nd represents refractive index and Vd represents Abbe-number. Again, in Table 4, "LPF" indicates a low pass filter having opposite planar surfaces and "IMA" is an image plane. It is also noted that in Table 4, "distance between lens surfaces" indicates the distance between the surface of the associated row and the surface of the next row. For example, for surface 1, the distance between lens surfaces means the distance between surfaces 1 and 2 of the table. Also, lens G5 and G6 are cemented together, so that lens G5 is shown having only one surface in Table 4, for the other surface of lens G5 is exactly coincident with one surface of the lens G6. This is also applicable to lens pairs of G8, G9 and G11, G12

TABLE 4

| Surface | Lens | Curvature Radius | Distance between lens surfaces | Nd | Vd |
|---|---|---|---|---|---|
| 1 | G1 | 32.20 | 0.62 | 1.923 | 20.9 |
| 2 | | 7.65 | 1.34 | | |
| 3 | G2 | infinite | 6.80 | 1.835 | 42.7 |
| 4 | | infinite | 0.30 | | |
| 5 | G3 | 12.08 | 2.15 | 1.739 | 48.8 |
| 6 | | −13.74 | A | | |
| 7 | G4 | 72.68 | 0.50 | 1.816 | 46.6 |
| 8 | | 6.79 | 0.92 | | |
| 9 | G5 | −10.00 | 0.45 | 1.788 | 47.4 |
| 10 | G6 | 7.69 | 0.93 | 1.923 | 20.9 |
| 11 | | 31.90 | B | | |
| 12 | G7 | 11.30 | 1.42 | 1.802 | 40.7 |
| 13 | | −62.73 | 0.95 | | |
| 14 | Ref Plane 1 | infinite | C | | |
| 15 | G8 | 12.70 | 2.40 | 1.589 | 61.2 |
| 16 | G9 | −5.50 | 0.58 | 1.805 | 25.4 |
| 17 | | −9.86 | D | | |
| 18 | G10 | 100.00 | 0.50 | 1.522 | 52.2 |
| 19 | | 70.00 | E | | |
| 20 | G11 | 51.63 | 0.50 | 1.806 | 33.3 |
| 21 | G12 | 4.88 | 2.31 | 1.487 | 70.2 |
| 22 | | 66.75 | F | | |
| 23 | Ref Plane 2 | infinite | 6.32 | | |
| 24 | G13 | 36.24 | 1.18 | 1.517 | 52.1 |
| 25 | | −37.20 | 1.07 | | |
| 26 | LPF | infinite | 0.80 | 1.516 | 64.1 |
| 27 | | infinite | 2.97 | | |
| IMA | | infinite | | | |

Table 5 gives the values of corresponding conic coefficient and aspheric coefficient of the five aspheric surfaces of the zoom lens in accordance with the present invention.

TABLE 5

| | Surface | | | | | | |
|---|---|---|---|---|---|---|---|
| | 5 | 6 | 12 | 13 | 15 | 18 | 19 |
| K | 0 | 0 | 0 | 0 | 0 | 0 | 0 |
| $E_4$ | −1.6021E−04 | 1.2479E−05 | −2.80091E−04 | −8.3886E−05 | −3.0533E−04 | 1.6920E−04 | 1.3762E−04 |
| $E_6$ | 9.3716E−06 | 9.9225E−06 | 4.2973E−06 | 4.7298E−06 | 8.6294E−06 | −9.2489E−05 | −9.8566E−05 |
| $E_8$ | −7.4108E−07 | −7.9778E−07 | −1.0824E−06 | −8.5860E−07 | −7.3838E−07 | 3.3544E−06 | 3.5686E−06 |
| $E_{10}$ | 1.9181E−08 | 2.1730E−08 | 1.0426E−07 | 8.2848E−08 | 3.8833E−08 | 0.0000E+00 | 0.0000E+00 |
| $E_{12}$ | −1.8465E−11 | 2.0437E−11 | −1.1754E−12 | −6.7855E−13 | −5.1944E−11 | 0.0000E+00 | 0.0000E+00 |

Table 6 lists the values of the distance A between the first and second lens groups, the distance B between the second and third lens groups, the distance C between the third and fourth lens groups as well as the distance D between the sixth and seventh lens groups, when the zoom lens of the present invention is respectively located at the wide-angle end (W), the medium position (M) and the telephoto end (T) thereof.

TABLE 6

| No. | W | M | T |
|---|---|---|---|
| A | 0.50 | 3.49 | 5.66 |
| B | 5.58 | 2.59 | 0.42 |
| C | 6.37 | 4.45 | 2.16 |
| D | 0.31 | 2.23 | 4.52 |
| E | 0.74 | 1.34 | 1.77 |
| F | 1.03 | 0.43 | 0.00 |

The periscope-type zoom lens in accordance with the present invention has a plurality of moveable lens groups, which effectively decrease the movement distance of each lens group. Thus, the size of the zoom lens can be greatly miniaturized. Also, the design of the present invention can ensure the optimum imaging performance at any of the focal points thereof as zoomed. Therefore, the periscope-type zoom lens of the present invention is advantageous in high magnification and good imaging performance.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A zoom lens comprising:
   an object-side fixed lens group having a positive refraction power and comprising a reflection element for folding an optic axis of the zoom lens;
   an image-side fixed lens group having a positive refraction power; and
   a moving lens subsystem arranged between the object-side fixed lens group and the image-side fixed lens group, the moving lens subsystem comprising an object-side moving lens group and an image-side moving lens group, both having a negative refraction power, and an intermediate lens unit arranged between the object-side moving lens group and the image-side moving lens group and comprising an intermediate moving lens group of positive refraction power located between an object-side internal fixed lens group of positive refraction power and an image-side internal fixed group.

2. The zoom lens as claimed in claim 1, wherein when the zoom lens is made to zoom from a wide-angle end to a telephoto end, the image-side moving lens group and object-side moving lens both move in a direction toward the image side, while the intermediate moving lens group moves in a direction toward the object side.

3. The zoom lens as claimed in claim 2, wherein the object-side moving lens group has a first focal distance and the image-side moving lens group has a second focal distance and wherein absolute value of ratio of the first focal distance to the second focal distance is within a range between 0.1 and 0.5.

4. The zoom lens as claimed in claim 1, wherein the object-side moving lens group has a first focal distance and the image-side moving lens group has a second focal distance and wherein absolute value of ratio of the first focal distance to the second focal distance is within a range between 0.1 and 0.5

5. The zoom lens as claimed in claim 1, wherein the reflection element has an object side and an image side and wherein the object-side fixed lens group comprises two lenses respectively located at the object side and the image side of the reflection element.

6. The zoom lens as claimed in claim 5, wherein the lens of the object-side fixed lens group that is located at the image side of the reflection element has at least one aspheric surface.

7. The zoom lens as claimed in claim 6, wherein the lens of the object-side fixed lens group that is located at the image side of the reflection element has two aspheric surfaces.

8. The zoom lens as claimed in claim 1, wherein the image-side fixed lens group comprises one lens.

9. The zoom lens as claimed in claim 1, wherein the object-side moving lens group comprises three lenses.

10. The zoom lens as claimed in claim 1, wherein the image-side moving lens group comprises two lenses.

11. The zoom lens as claimed in claim 1, wherein the object-side internal fixed lens group comprises one lens having at least one aspheric surface.

12. The zoom lens as claimed in claim 11, wherein the lens of the object-side internal fixed lens group has two aspheric surfaces.

13. The zoom lens as claimed in claim 1, wherein the intermediate moving lens group comprises an image-side lens and an object-side lens, the image-side lens having an aspheric surface facing the image side.

14. The zoom lens as claimed in claim 1, wherein the image-side internal fixed lens group comprises one lens.

15. The zoom lens as claimed in claim 14, wherein the lens of the image-side internal fixed lens group has at least one aspheric surface.

16. The zoom lens as claimed in claim 15, wherein the lens of the image-side internal fixed lens group has two aspheric surfaces.

* * * * *